(12) United States Patent
Ohno

(10) Patent No.: US 10,583,758 B2
(45) Date of Patent: Mar. 10, 2020

(54) OCCUPANT PROTECTION DEVICE

(71) Applicant: TOYOTA JIDOSHA KABUSHIKI KAISHA, Toyota-shi, Aichi-ken (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/079,413

(22) Filed: Mar. 24, 2016

(65) Prior Publication Data
US 2017/0008480 A1    Jan. 12, 2017

(30) Foreign Application Priority Data

Jul. 6, 2015 (JP) ................................. 2015-135579

(51) Int. Cl.
| | |
|---|---|
| *B60N 2/66* | (2006.01) |
| *B60R 21/015* | (2006.01) |
| *B60N 2/427* | (2006.01) |
| *B60N 2/42* | (2006.01) |
| *B60R 16/02* | (2006.01) |
| *B60N 2/90* | (2018.01) |

(52) U.S. Cl.
CPC ............. *B60N 2/66* (2013.01); *B60N 2/4235* (2013.01); *B60N 2/4279* (2013.01); *B60N 2/665* (2015.04); *B60N 2/6671* (2015.04); *B60N 2/6673* (2015.04); *B60N 2/914* (2018.02); *B60N 2/99* (2018.02); *B60R 16/02* (2013.01); *B60R 21/015* (2013.01)

(58) Field of Classification Search
CPC ............ B60R 21/015; B60R 21/01504; B60R 21/01508; B60R 22/195; B60R 2021/022; B60N 2/0276; B60N 2/66; B60N 2/4492
See application file for complete search history.

(56) References Cited

U.S. PATENT DOCUMENTS

| | | | |
|---|---|---|---|
| 6,213,512 B1 | 4/2001 | Swann et al. | |
| 9,393,931 B2 * | 7/2016 | Onishi | .................... B60R 22/48 |
| 2001/0040065 A1* | 11/2001 | Takagi | .............. B60R 21/01516 |
| | | | 180/274 |

(Continued)

FOREIGN PATENT DOCUMENTS

| | | |
|---|---|---|
| JP | 2000-125988 A | 5/2000 |
| JP | 2004-148969 A | 5/2004 |

(Continued)

*Primary Examiner* — Barry Gooden, Jr.
(74) *Attorney, Agent, or Firm* — Oliff PLC

(57) ABSTRACT

An occupant protection device including: a side support section; a lumbar support section that is provided to the width direction intermediate portion of the seatback, and that has a support face displaceable between an advanced position pressing the lumbar region and a retreated position further to a seatback rear side than the advanced position; a displacement mechanism that displaces the support face of the lumbar support section between the advanced position and the retreated position; a side collision prediction section; an actuation controller that, in a case in which a vehicle side-on collision has been predicted by the side collision prediction section in a state in which the support face of the lumbar support section is not at the retreated position, controls the displacement mechanism so as to displace the support face of the lumbar support section to the retreated position.

6 Claims, 5 Drawing Sheets

(56) References Cited

U.S. PATENT DOCUMENTS

| | | | |
|---|---|---|---|
| 2004/0061362 A1* | 4/2004 | Farquhar | B60N 2/4864 297/216.12 |
| 2006/0006719 A1* | 1/2006 | Friedman | B60N 2/42745 297/377 |
| 2006/0196715 A1* | 9/2006 | Fujishiro | B60N 2/0276 180/271 |
| 2010/0117412 A1* | 5/2010 | Bicker | B60N 2/002 297/217.1 |
| 2010/0140990 A1* | 6/2010 | Spahn | B60N 2/0276 297/216.13 |
| 2010/0207363 A1 | 8/2010 | Fredriksson et al. | |
| 2013/0169010 A1* | 7/2013 | Sugiyama | B60N 2/22 297/216.13 |
| 2015/0203013 A1* | 7/2015 | Akutsu | B60N 2/682 297/452.18 |
| 2015/0367756 A1* | 12/2015 | Katoh | B60N 2/666 297/285 |
| 2016/0090063 A1* | 3/2016 | Onishi | B60R 22/48 701/46 |
| 2016/0114710 A1* | 4/2016 | Edgar | B60N 2/643 297/452.48 |
| 2016/0325641 A1* | 11/2016 | Ohno | B60N 2/0276 |
| 2016/0339803 A1* | 11/2016 | Beuschel | B60N 2/66 |
| 2016/0339860 A1* | 11/2016 | Shimazu | B60R 21/0134 |
| 2017/0036633 A1* | 2/2017 | Kobayashi | B60R 22/00 |
| 2017/0036634 A1* | 2/2017 | Ohno | B60R 21/013 |
| 2017/0361796 A1* | 12/2017 | Kim | B60K 31/0008 |

FOREIGN PATENT DOCUMENTS

| | | |
|---|---|---|
| JP | 2005-335616 A | 12/2005 |
| JP | 2006-110221 A | 4/2006 |
| JP | 2007-314015 A | 12/2007 |
| JP | 2008-207764 A | 9/2008 |
| JP | 2010-540304 A | 12/2010 |
| JP | 2013154867 A * | 8/2013 |

* cited by examiner

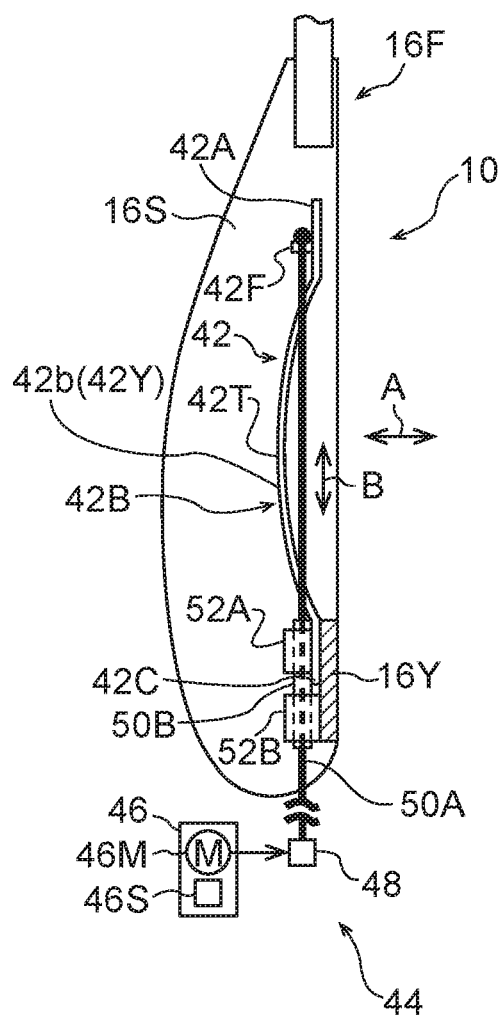
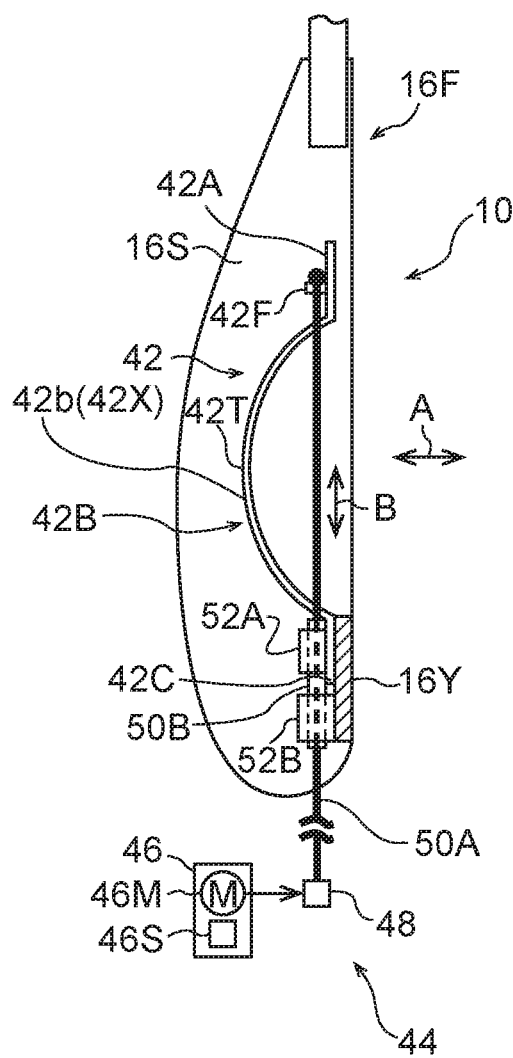

OCCUPANT PROTECTION DEVICE

CROSS-REFERENCE TO RELATED APPLICATION

This application is based on and claims priority under 35 USC 119 from Japanese Patent Application No. 2015-135579 filed on Jul. 6, 2015, the disclosure of which is incorporated by reference herein.

BACKGROUND

Technical Field

The present invention relates to an occupant protection device.

Related Art

Structures and devices are known for protecting an occupant seated in a vehicle seat in the event of a side collision to the vehicle (Japanese Patent Application Laid-Open (JP-A) Nos. 2006-110221, 2008-207764, 2000-125988). For example, JP-A No. 2006-110221 describes a structure in which portions on both width direction sides of a seatback configure side support sections that protrude out further toward the seat front side than a width direction intermediate portion of the seatback. In this structure, a seated occupant is supported by the side support sections in the event of a side-on collision.

The related art described in JP-A No. 2006-110221 above is an effective protection measure for a seated occupant in the event of a side-on collision. However, this related art is not a configuration in which a width direction intermediate portion of the seatback is provided with a lumbar support section that has a support face that supports the lumbar region of the seated occupant and is displaceable in the seatback front-rear direction, and is therefore not a configuration that gives consideration to the setting of a support face of the lumbar support section. For example, were a lumbar support section to be provided to the configuration described in JP-A No. 2006-110221, then if the support face of the lumbar support section were to be set at an advanced position by user operation, an overlap amount between the side support sections and the occupant as viewed from the side of the vehicle would be reduced, thus leaving room for improvement from the perspective of protecting the seated occupant in the event of a side-on collision.

SUMMARY

In consideration of the above circumstances, an object of the present invention is to obtain an occupant protection device capable of supporting a seated occupant well with a side support section in the event of a side-on collision, even when, due to user operation, a support face of a lumbar support section is not set at a retreated position.

An occupant protection device of a first aspect of the present invention includes: a side support section that configures portions on both width direction sides of a seatback of a vehicle seat disposed with a seat width direction in a vehicle width direction, and that protrudes out further toward a seatback front side than a width direction intermediate portion of the seatback; a lumbar support section that is provided to the width direction intermediate portion of the seatback, that supports a lumbar region of an occupant seated on a seat cushion of the vehicle seat, and that has a support face displaceable between an advanced position pressing the lumbar region and a retreated position further to a seatback rear side than the advanced position; a displacement mechanism that displaces the support face of the lumbar support section between the advanced position and the retreated position; a side collision prediction section that predicts a side-on collision to a vehicle; and an actuation controller that, in a case in which a vehicle side-on collision has been predicted by the side collision prediction section in a state in which the support face of the lumbar support section is not at the retreated position, controls the displacement mechanism so as to displace the support face of the lumbar support section to the retreated position.

According to the above configuration, in a case in which a vehicle side-on collision has been predicted by the side collision prediction section in a state in which the support face of the lumbar support section is not at the retreated position, the support face of the lumbar support section is displaced to the retreated position. The upper body of the seated occupant that was resting against the width direction intermediate portion of the seatback accordingly undergoes displacement toward the seatback rear side under its own weight, thereby enabling an overlap amount between the side support section and the seated occupant as viewed from the side of the vehicle to be increased. This thereby enables the seated occupant attempting to move in the vehicle width direction during a side-on collision to be stably supported by the side support sections as a result.

An occupant protection device of a second aspect of the present invention is the configuration of the first aspect, further including: a three-point seatbelt device that includes a spool for taking up a seatbelt, that restrains the upper body of the occupant seated on the seat cushion with a shoulder belt portion configuring a portion of the seatbelt, and that restrains the lumbar region of the occupant with a lap belt portion configuring another portion of the seatbelt; and a pre-tensioner that actuates to rotate the spool in a direction to take up the seatbelt so as to apply tension to the shoulder belt portion, wherein in a case in which a vehicle side-on collision has been predicted by the side collision prediction section in a state in which the support face of the lumbar support section is not at the retreated position, the actuation controller actuates the pre-tensioner so as to take up the seatbelt onto the spool so as to match displacement of the support face of the lumbar support section toward the seatback rear side.

According to the above configuration, in a case in which a vehicle side-on collision has been predicted by the side collision prediction section in a state in which the supporting face of the lumbar support section is not at the retreated position, the pre-tensioner is actuated, and the seatbelt is taken up onto the spool so as to match the displacement of the support face of the lumbar support section toward the seatback rear side. The upper body of the seated occupant accordingly undergoes displacement toward the seatback rear side while being pushed against the width direction intermediate portion of the seatback by the seatbelt (shoulder belt portion). This thereby enables the overlap amount between the side support section and the seated occupant as viewed from the side of the vehicle to be increased even more stably, and also enables the restraint performance of the seated occupant to be further improved in the event of a side-on collision.

An occupant protection device of a third aspect of the present invention is the configuration of either the first aspect or the second aspect, further including: a bladder body that is disposed inside the side support section, and that is inflated by being supplied with gas to cause the side support section to protrude out further toward the seatback front side; and a gas supply mechanism that is capable of supplying gas inside the bladder body, wherein in a case in which a vehicle side-on collision has been predicted by the side collision prediction section in a state in which the bladder body is not in a maximum inflation state, the actuation controller actuates the gas supply mechanism so as to supply gas inside the bladder body.

According to the above configuration, in a case in which a vehicle side-on collision has been predicted by the side collision prediction section in a state in which the bladder body disposed inside the side support section is not in the maximum inflation state, the gas supply mechanism is actuated and gas is supplied into the bladder body. The bladder body accordingly attains the maximum inflation state, such that the side support section protrudes out further toward the seatback front side. This thereby enables the seated occupant attempting to move in the vehicle width direction to be supported even at the locations where the side support section protrudes out further toward the seatback front side in the event of a side-on collision.

As described above, the occupant protection device of the present invention exhibits the excellent advantageous effect of enabling a seated occupant to be well-supported by the side support section in the event of a side-on collision, even when, due to user operation, the support face of the lumbar support section is not set at the retreated position.

BRIEF DESCRIPTION OF THE DRAWINGS

Exemplary embodiments of the present invention will be described in detail based on the following figures, wherein:

FIG. 3A is a schematic side view illustrating a lumbar support device including a lumbar support section illustrated in FIG. 1, illustrating a state in which a support face of the lumbar support section is disposed at a retreated position;

FIG. 3B is a side view schematically illustrating a lumbar support device including a lumbar support section illustrated in FIG. 1, illustrating a state in which a support face of the lumbar support section is disposed at an advanced position;

DETAILED DESCRIPTION

First Exemplary Embodiment

Figure 1:
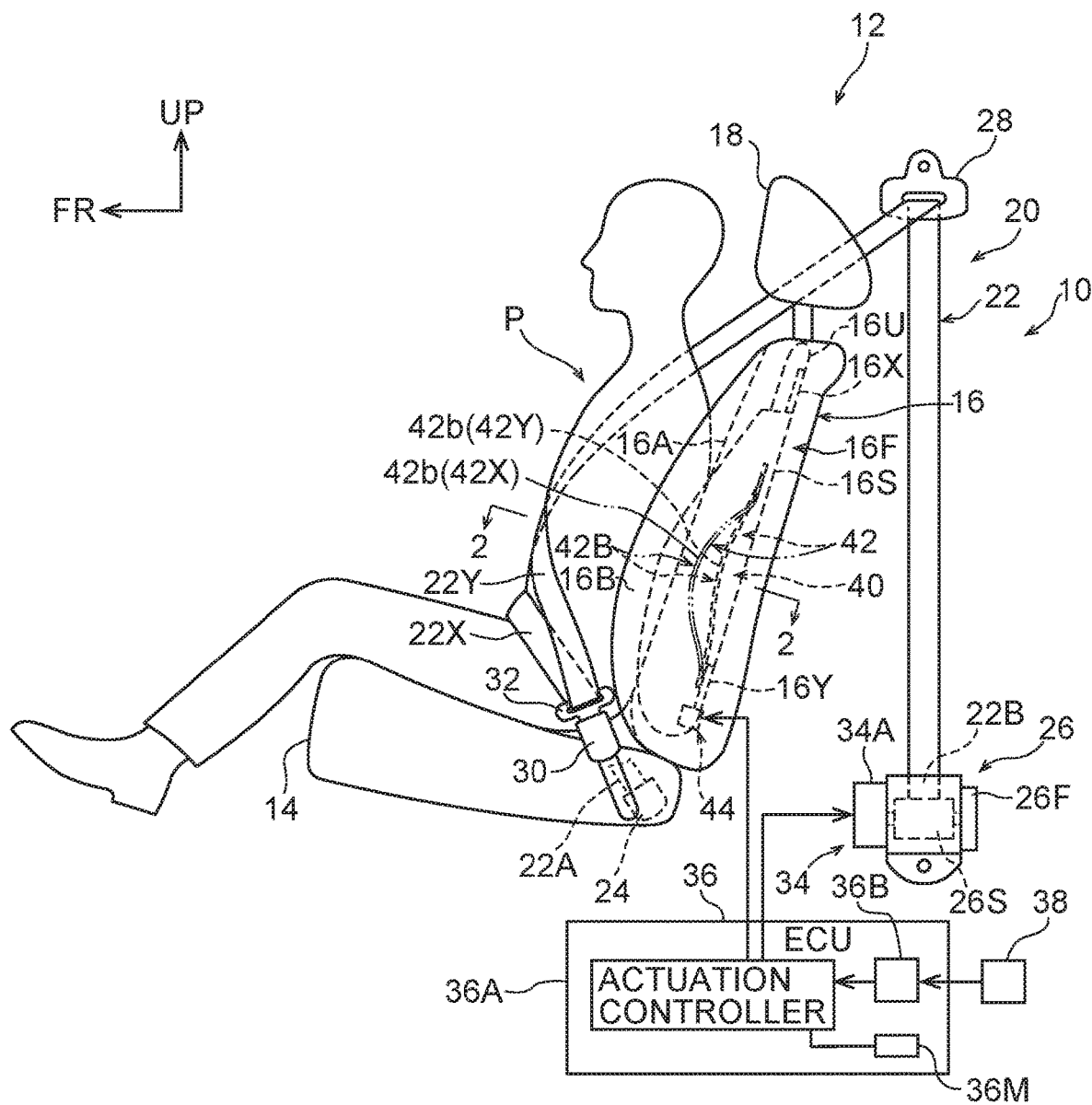
FIG. 1 is a side view schematically illustrating a vehicle seat applied with an occupant protection device according to a first exemplary embodiment.

Explanation follows regarding an occupant protection device according to a first exemplary embodiment of the present invention, with reference to FIG. 1 to FIG. 3B. In the drawings, the arrow FR indicates the vehicle front side, the arrow UP indicates the vehicle upper side, and the arrow W indicates the vehicle width direction, as appropriate.

Vehicle Seat Schematic Configuration

FIG. 1 is a side view schematically illustrating a vehicle seat 12 applied with an occupant protection device 10 according to the present exemplary embodiment. As an example, the vehicle seat 12 illustrated in FIG. 1 configures a front driving seat disposed such that the seat width direction runs in the vehicle width direction, and disposed facing the vehicle front side. In the present exemplary embodiment, a World Side Impact Dummy P (WorldSID) is seated in the vehicle seat 12 in the place of an actual occupant. The seating posture is as currently specified in the Japanese and European side impact testing method (ECE R95), or in the US side impact testing method (FMVSS214). In the following, the WorldSID dummy P is referred to as the "occupant P" for convenience.

The vehicle seat 12 includes a seat cushion 14 that supports the buttocks and thighs of the occupant P. A seatback 16 that supports the back (and lumbar region) of the occupant P is supported at a rear end portion of the seat cushion 14. The seatback 16 can be reclined using a reclining mechanism (not illustrated in the drawings) provided at a coupling portion between the seatback 16 and the seat cushion 14. A headrest 18 that supports the head of the occupant P is attached to an upper end portion of the seatback 16. The height of the headrest 18 is adjustable.

Figure 2:
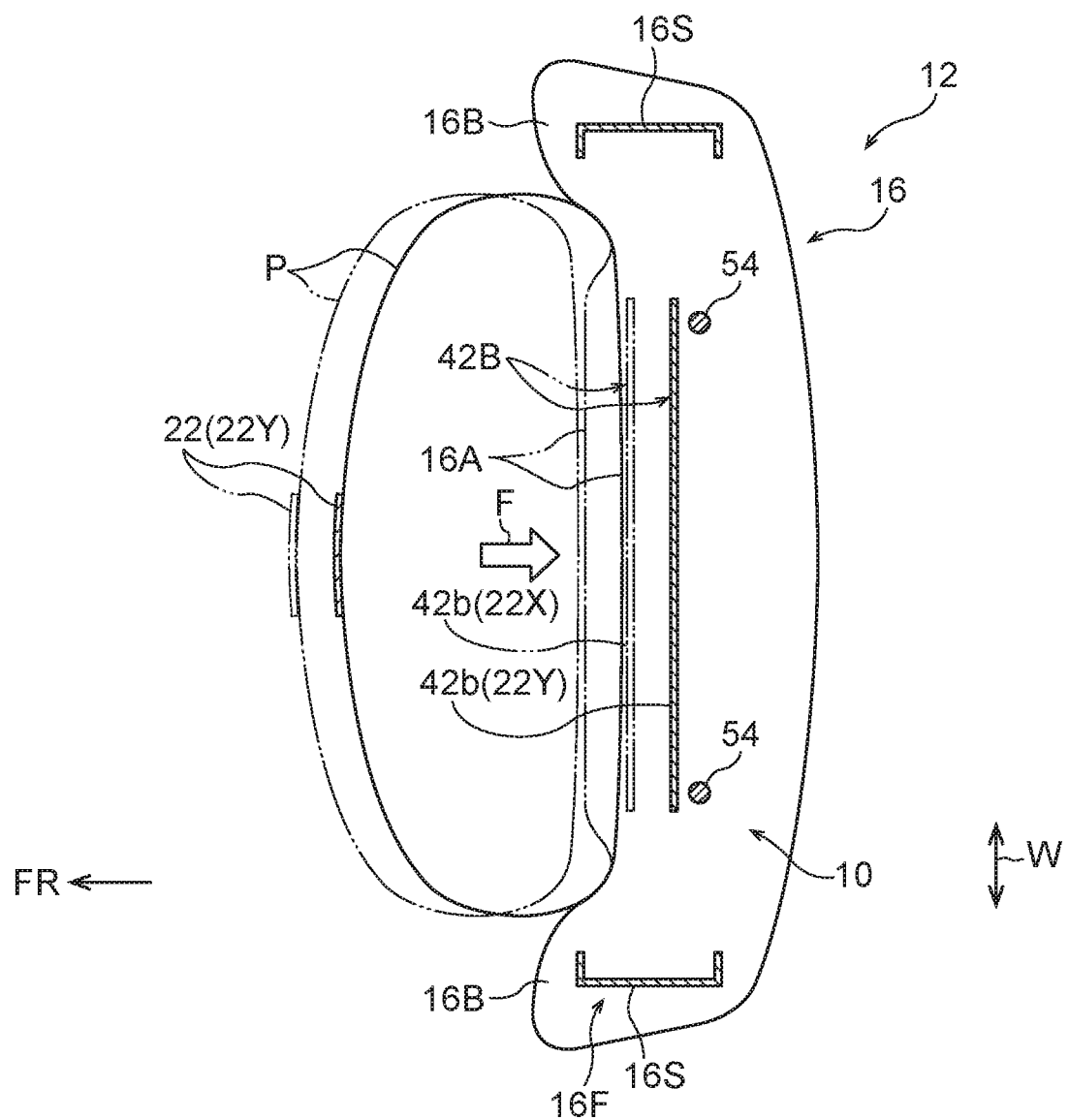
FIG. 2 is an enlarged cross-section schematically illustrating an enlarged state, sectioned along line 2-2 in FIG. 1.

FIG. 2 is an enlarged cross-section schematically illustrating a state sectioned along line 2-2 in FIG. 1. Although omitted from illustration in FIG. 2, a seatback pad is disposed at a front face side inside the seatback 16, and the seatback pad is covered by a skin at a front face and both side faces of the seatback 16.

As illustrated in FIG. 2, a width direction intermediate portion of the seatback 16 is configured by a backrest section 16A. The backrest section 16A is configured at a location supporting a back face side of the occupant P. Both width direction side portions of the seatback 16 are configured including a side support section 16B. The pair of left and right side support sections 16B protrude out further toward the seatback front side than the backrest section 16A (width direction intermediate portion of the seatback 16), and configure locations supporting side face sides of the occupant P. Note that the larger the protrusion amount of the side support sections 16B toward the seatback front side, the better from the perspective of compatibility to a side impact; however, the protrusion amount is also set in consideration of the comfort of the seated occupant and the like.

As illustrated in FIG. 1 and FIG. 2, a metal seatback frame 16F, serving as a framework member of the seatback 16, is provided inside the seatback 16. Since the seatback frame 16F has a known configuration, detailed explanation thereof will be omitted; however, it is explained in brief below. The seatback frame 16F includes a pair of left and right side frames 16S extending in a seatback up-down direction at both sides of the seatback 16, and an upper frame 16U (see FIG. 1) that is configured in an inverted U-shape in face-on view of the seatback, and connects together upper end portions of the left and right side frames 16S. In the present exemplary embodiment, a portion of each side frame 16S configures a portion of the corresponding side support section 16B. The seatback frame 16F further includes seatback upper reinforcement 16X that connects together locations of the upper frame 16U extending in the seatback up-down direction, illustrated in FIG. 1, along the seatback width direction, and seatback lower reinforcement 16Y that connects together lower portions of the left and right side frames 16S along the seatback width direction.

Configuration of Three-Point Seatbelt Device and the Like

A three-point seatbelt device 20 is provided corresponding to the vehicle seat 12. The three-point seatbelt device 20 includes a seatbelt 22 (webbing) for occupant restraint. One end portion 22A of the seatbelt 22 is attached to a side portion on the vehicle width direction outside of the seat cushion 14 (a side face portion on the side toward the inside of the page in FIG. 1) through an anchor plate 24, and another end portion 22B of the seatbelt 22 is anchored to a spool 26S of a seatbelt take-up device 26 (webbing take-up device). An intermediate portion of the seatbelt 22 is inserted through and folded back around a shoulder anchor 28 provided at an upper side of a vehicle side portion. A buckle device 30 is provided upright at a vehicle width direction inside side portion of the seat cushion 14 (the side face portion illustrated in FIG. 1). A tongue plate 32 that is supported in a state with the intermediate portion of the seatbelt 22 inserted through it is capable of engaging with the buckle device 30.

In the three-point seatbelt device 20, the tongue plate 32 engages with the buckle device 30 in a seated state of the occupant P on the seat cushion 14, such that the seatbelt 22 is worn across the seated occupant P (an occupant seated on the seat cushion 14). In an engaged state of the tongue plate 32 with the buckle device 30, a portion of the seatbelt 22 positioned between the tongue plate 32 and the anchor plate 24 configures a lap belt portion 22X, and a portion of the seatbelt 22 positioned between the tongue plate 32 and the shoulder anchor 28 configures a shoulder belt portion 22Y. The lap belt portion 22X restrains the lumbar region of the seated occupant P, and the shoulder belt portion 22Y restrains the upper body of the occupant P.

The seatbelt take-up device 26 is fixed in the vicinity of a lower end portion of a center pillar, not illustrated in the drawings, configuring a vehicle framework member. In the seatbelt take-up device 26, the spool 26S that takes up the seatbelt 22 is disposed with its axial center direction running along the vehicle front-rear direction. A biasing mechanism 26F is disposed on one side (the vehicle rear side) of the spool 26S. The biasing mechanism 26F places the spool 26S under a constant bias toward a seatbelt take-up direction (take-up rotation direction) of the seatbelt 22.

The seatbelt take-up device 26 includes a pre-tensioner 34. On actuation, the pre-tensioner 34 applies tension to the shoulder belt portion 22Y by rotating the spool 26S in the take-up direction of the seatbelt 22. The pre-tensioner 34 includes a motor 34A disposed on the other side (the vehicle front side) of the spool 26S. The motor 34A rotates to drive the spool 26S in the take-up direction. The motor 34A is electrically connected to an ECU 36 that is installed to the vehicle.

The ECU 36 includes an actuation controller 36A, a side collision prediction section 36B, and a memory section 36M. The side collision prediction section 36B is electrically connected to a pre-crash safety (PCS) sensor 38 for predicting a side collision. The PCS sensor 38 is configured including a distance sensor such as a milli-wave radar, and outputs signals to the side collision prediction section 36B according to the relative distance of a vehicle (monitoring target object) positioned to the side of the vehicle itself. The side collision prediction section 36B predicts a vehicle side-on collision based on the signals output from the PCS sensor 38. The actuation controller 36A actuates the motor 34A of the pre-tensioner 34 when a vehicle side-on collision has been predicted by the side collision prediction section 36B, thereby rotating the spool 26S in the take-up direction of the seatbelt 22 so as to apply tension to the shoulder belt portion 22Y.

Prediction of a vehicle side-on collision by the side collision prediction section 36B encompasses cases in which a collision is determined to be unavoidable, and also cases in which the probability of a collision is determined to be higher than a specific threshold value. Although detailed explanation is omitted here, the pre-tensioner 34 is also controlled by the actuation controller 36A so as to actuate when the vehicle decelerates suddenly. The memory section 36M is, for example, configured by RAM.

Lumbar Support Device Configuration

A lumbar support device 40 is disposed in the seatback 16 of the vehicle seat 12. The lumbar support device 40 includes a lumbar support section 42B that supports the lumbar region of the occupant P seated on the seat cushion 14 of the vehicle seat 12, and also includes a displacement mechanism 44 (illustrated in block form in the drawings) for displacing the lumbar support section 42B. Note that in FIG. 1, the lumbar support section 42B illustrated by double-dotted intermittent lines represents the lumbar support section in a state in which a support face 42b of the lumbar support section 42B is at an advanced position 42X, described later. The lumbar support section 42B is inbuilt to the backrest section 16A (a width direction intermediate portion of the seatback 16) over a range supporting the lumbar region of the occupant P (a lower portion side of the backrest section 16A), and is configured by a portion of a plate shaped lumbar support member 42.

FIG. 3A and FIG. 3B are side views schematically illustrating the lumbar support device 40. Note that FIG. 3A and FIG. 3B substantially correspond to side views in a state in which out of the pair of left and right side frames 16S, the side frame disposed on the near side in the side views has been removed, and in a state in which the seatback lower reinforcement 16Y has been removed at an end portion on the near side in the drawings. The respective configuration elements illustrated in FIG. 3A and FIG. 3B are simplified or shown schematically.

An upper end portion 42A and a lower end portion 42C of the lumbar support member 42 illustrated in FIG. 3A extend in the seatback up-down direction and the seatback width direction, and the curved lumbar support section 42B connects between a lower end of the upper end portion 42A and an upper end of the lower end portion 42C. The lower end portion 42C of the lumbar support member 42 is fixed to the seatback lower reinforcement 16Y (seatback frame 16F) through another member, not illustrated in the drawings. The lumbar support section 42B curves in a shape projecting toward the seatback front side, and extends in the seatback width direction.

As illustrated in FIG. 3A and FIG. 3B, the lumbar support section 42B is displaceable in the seatback front-rear direction. More specifically, the support face 42b of the lumbar support section 42B is displaceable between the advanced position 42X (see FIG. 3B) pressing the lumbar region of the occupant P (see FIG. 1), and a retreated position 42Y (see FIG. 3A) further to the seatback rear side than the advanced position 42X. The advanced position 42X (see FIG. 3B) is the position of a front side movement limit of the support face 42b of the lumbar support section 42 in the seatback front-rear direction. The retreated position 42Y (see FIG. 3A) is the position of a rear side movement limit of the support face 42b of the lumbar support section 42 in the seatback front-rear direction.

Although not illustrated in FIG. 3A or FIG. 3B, when the support face 42b of the lumbar support section 42B is displaced between the advanced position 42X and the retreated position 42Y, a front face of the backrest section 16A (see FIG. 1) also undergoes corresponding displacement in the seatback front-rear direction. The double-dotted intermittent lines in FIG. 2 indicate the respective positions of the lumbar support section 42B, the front face of the backrest section 16A, the occupant P, and the shoulder belt portion 22Y in a state in which the support face 42*b* of the lumbar support section 42B is disposed at the advanced position 42X.

As illustrated in FIG. 3A and FIG. 3B, the support face 42*b* of the lumbar support member 42 is displaced in the seatback front-rear direction (arrow A direction) between the advanced position 42X (see FIG. 3B) and the retreated position 42Y (see FIG. 3A) by the displacement mechanism 44 (this being an element also understood as an "advancing-and-retreating mechanism"). The displacement mechanism 44 includes a motor 46, illustrated on the lower side in the drawings. The motor 46 is attached to the seatback frame 16F through brackets or the like, not illustrated in the drawings, and includes a motor body 46M and a sensor section 46S. The motor body 46M is configured so as to be driven based on command signals output from the actuation controller 36A (see FIG. 1). The sensor section 46S includes, for example, a Hall effect IC, and is configured so as to output signals to the memory section 36M (see FIG. 1) according to the rotation (rotation position) of an output shaft of the motor body 46M.

The motor body 46M is connected to a feed screw mechanism 48 that converts rotational movement of the output shaft of the motor body 46M into linear movement. The feed screw mechanism 48 is connected to an inner cable 50A of a push-pull wire 50. The inner cable 50A is disposed at the seatback width direction outside of the lumbar support section 42B, and at the seatback front side of side portions of the upper end portion 42A and the lower end portion 42C of the lumbar support member 42 that respectively jut out to the seatback width direction outside. The inner cable 50A is inserted through an outer cable 50B so as to be capable of moving. The outer cable 50B is fixed to the side portion of the lower end portion 42C of the lumbar support member 42 through a coupling portion 52A, and is disposed such that the axial direction of the outer cable 50B runs along the seatback up-down direction at the fixing location. The outer cable 50B is fixed to the seatback lower reinforcement 16Y (seatback frame 16F) through a coupling portion 52B. An upper end portion of the inner cable 50A is fixed to an attachment portion 42F jutting out from a side portion of the upper end portion 42A of the lumbar support section 42 toward the seatback front side.

Although not illustrated in the drawings, a guide mechanism for guiding the lumbar support member 42 in the seatback up-down direction is provided at the side of the two side portions of the upper end portion 42A of the lumbar support member 42. The guide mechanism is configured by a pair of left and right guide wire portions 54 (see FIG. 2) extending in the seatback up-down direction further to the seatback rear side than the lumbar support member 42, and C-shaped wire insertion portions (not illustrated in the drawings) that extend out toward the seatback rear side from the sides of the two side portions of the upper end portion 42A of the lumbar support member 42, and through which the respective guide wire portions 54 (see FIG. 2) are inserted. Note that the guide wire portions 54 illustrated in FIG. 2 are fixed to the seatback upper reinforcement 16X (see FIG. 1) and the seatback lower reinforcement 16Y (see FIG. 1) of the seatback frame 16F through another member (not illustrated in the drawings).

Due to the above configuration, the inner cable 50A moves corresponding to rotation of the motor body 46M illustrated in FIG. 3A and FIG. 3B (see the arrow B direction), thereby changing the relative position of the upper end portion 42A with respect to the lower end portion 42C of the lumbar support member 42 in the seatback up-down direction, and changing the projection amount of the lumbar support section 42B. Namely, the support face 42*b* (including a protrusion apex portion 42T) of the lumbar support section 42B is displaced in the front-rear direction of the seatback 16 by rotation of the motor body 46M.

At a side face of the seat cushion 14 (see FIG. 1), the lumbar support device 40 also includes a manual switch (not illustrated in the drawings) that is employed by the occupant to adjust the position of the support face 42*b* of the lumbar support section 42B. The manual switch is configured so as to output signals to the ECU 36 (see FIG. 1) according to the operation of the occupant.

The motor 46 of the displacement mechanism 44 is electrically connected to the ECU 36 (see FIG. 1). In cases in which a vehicle side-on collision has been predicted by the side collision prediction section 36B in a state in which the support face 42*b* of the lumbar support section 42B is not at the retreated position 42Y, the actuation controller 36A illustrated in FIG. 1 controls the motor body 46M (see FIG. 3) of the displacement mechanism 44 such that the support face 42*b* of the lumbar support section 42B is displaced to the retreated position 42Y. Moreover, in cases in which a vehicle side-on collision has been predicted by the side collision prediction section 36B in a state in which the support face 42*b* of the lumbar support section 42B is not at the retreated position 42Y, the motor 34A of the pre-tensioner 34 is actuated such that the seatbelt 22 is taken up onto the spool 26S so as to match the displacement of the support face 42*b* of the lumbar support section 42B toward the seatback rear side.

To explain further, in the present exemplary embodiment, the time taken from starting drive of the motor body 46M of the displacement mechanism 44 (see FIG. 3A and FIG. 3B) until the support face 42*b* of the lumbar support section 42B starts to displace toward the seatback rear side is slightly longer than the time taken from starting drive of the motor 34A of the pre-tensioner 34 until the seatbelt 22 starts to be taken up onto the spool 26S. Accordingly, in the present exemplary embodiment, the actuation controller 36A outputs a drive command signal to the motor body 46M of the displacement mechanism 44 (see FIG. 3A and FIG. 3B) slightly earlier than it outputs a drive command signal to the motor 34A of the pre-tensioner 34.

The memory section 36M illustrated in FIG. 1 stores a signal output from the sensor section 46S (see FIG. 3A) as position information of the support face 42*b* of the lumbar support section 42B. The actuation controller 36A determines whether or not a state is present in which the support face 42*b* of the lumbar support section 42B is not at the retreated position 42Y based on the position information of the support face 42*b* of the lumbar support section 42B stored in the memory section 36M. Moreover, the actuation controller 36A does not actuate the motor body 46M of the displacement mechanism 44 in cases in which a vehicle side-on collision has been predicted by the side collision prediction section 36B in a state in which the support face 42*b* of the lumbar support section 42B is at the retreated position 42Y.

Operation and Advantageous Effects

Next, explanation follows regarding operation and advantageous effects of the exemplary embodiment described above.

In the present exemplary embodiment, the lumbar support section 42B illustrated in FIG. 1 supports the lumbar region of the occupant P seated on the seat cushion 14 of the vehicle seat 12. The support face 42*b* of the lumbar support section 42B is displaceable between the advanced position 42X and the retreated position 42Y. The support face 42b of the lumbar support section 42B is displaced between the advanced position 42X and the retreated position 42Y by the displacement mechanism 44. Accordingly, the seated occupant can operate the manual switch (not illustrated in the drawings) to set the support face 42b of the lumbar support section 42B to a comfortable position.

In cases in which a vehicle side-on collision has been predicted by the side collision prediction section 36B (see FIG. 1) in a state in which the support face 42b of the lumbar support section 42B is not at the retreated position 42Y, as illustrated by the double-dotted intermittent lines in FIG. 1 and FIG. 2, the displacement mechanism 44 (see FIG. 3A and FIG. 3B) is actuated, thereby displacing the support face 42b of the lumbar support section 42B to the retreated position 42Y, illustrated by solid lines in FIG. 2. The upper body of the occupant P that was resting against the backrest section 16A of the seatback 16 thereby undergoes displacement toward the seatback rear side under its own weight, enabling an overlap amount between the side support sections 16B and the occupant P as viewed from the side of the vehicle to be increased. This thereby enables the occupant P attempting to move in the vehicle width direction during a side-on collision to be stably supported by the side support sections 16B.

To explain further, the occupant P attempting to move under inertia toward the collision side (one side in the vehicle width direction) during a side-on collision is stably supported by the side support section 16B on the collision side (the one side in the vehicle width direction). Then, the occupant P attempting to move by swinging back toward the collision-opposite side (the other side in the vehicle width direction) is stably supported by the side support section 16B on the collision-opposite side (the other side in the vehicle width direction).

In the present exemplary embodiment, in cases in which a vehicle side-on collision has been predicted by the side collision prediction section 36B in a state in which the support face 42b of the lumbar support section 42B illustrated in FIG. 1 is not at the retreated position 42Y illustrated by the double-dotted intermittent lines, the pre-tensioner 34 is actuated, and the seatbelt 22 is taken up onto the spool 26S so as to match the displacement of the support face 42b of the lumbar support section 42B toward the seatback rear side. Accordingly, as illustrated in FIG. 2, the upper body of the occupant P is displaced toward the seatback rear side while being pressed against the backrest section 16A of the seatback 16 (see arrow F) by the seatbelt 22 (shoulder belt portion 22Y). This thereby enables the overlap amount between the side support sections 16B and the occupant P as viewed from the side of the vehicle to be even more stably increased, and enables initial restraint performance of the occupant P to be further improved in the event of a side-on collision.

As described above, in the occupant protection device 10 of the present exemplary embodiment, the seated occupant can be well-supported by the side support sections 16B in the event of a side-on collision, thereby enabling good occupant protection performance to be obtained even when, as a result of operation by the occupant, the support face 42b of the lumbar support section 42B is not set at the retreated position 42Y.

Second Exemplary Embodiment

Figure 4:
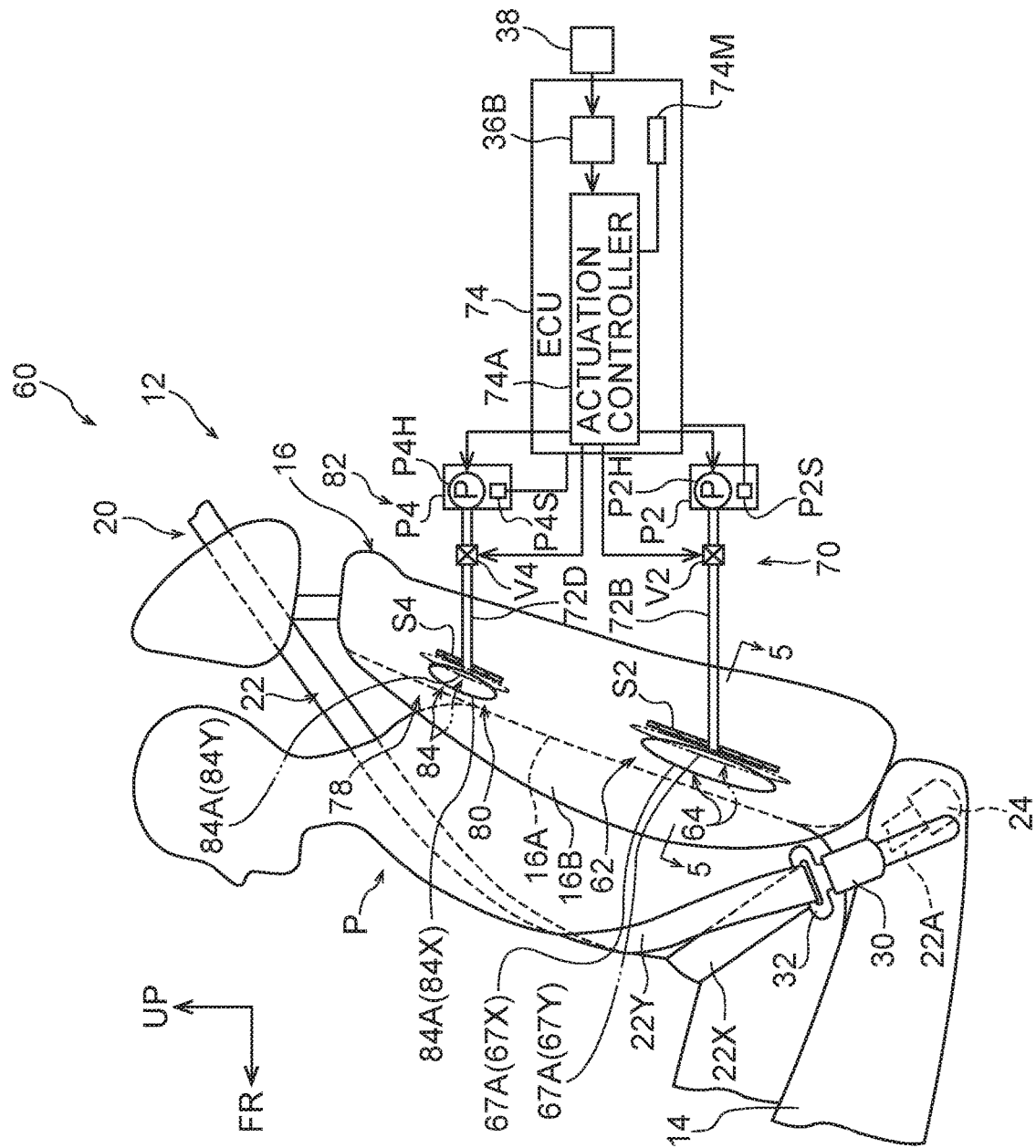
FIG. 4 is a side view schematically illustrating a vehicle seat applied with an occupant protection device according to a second exemplary embodiment.
Figure 5:
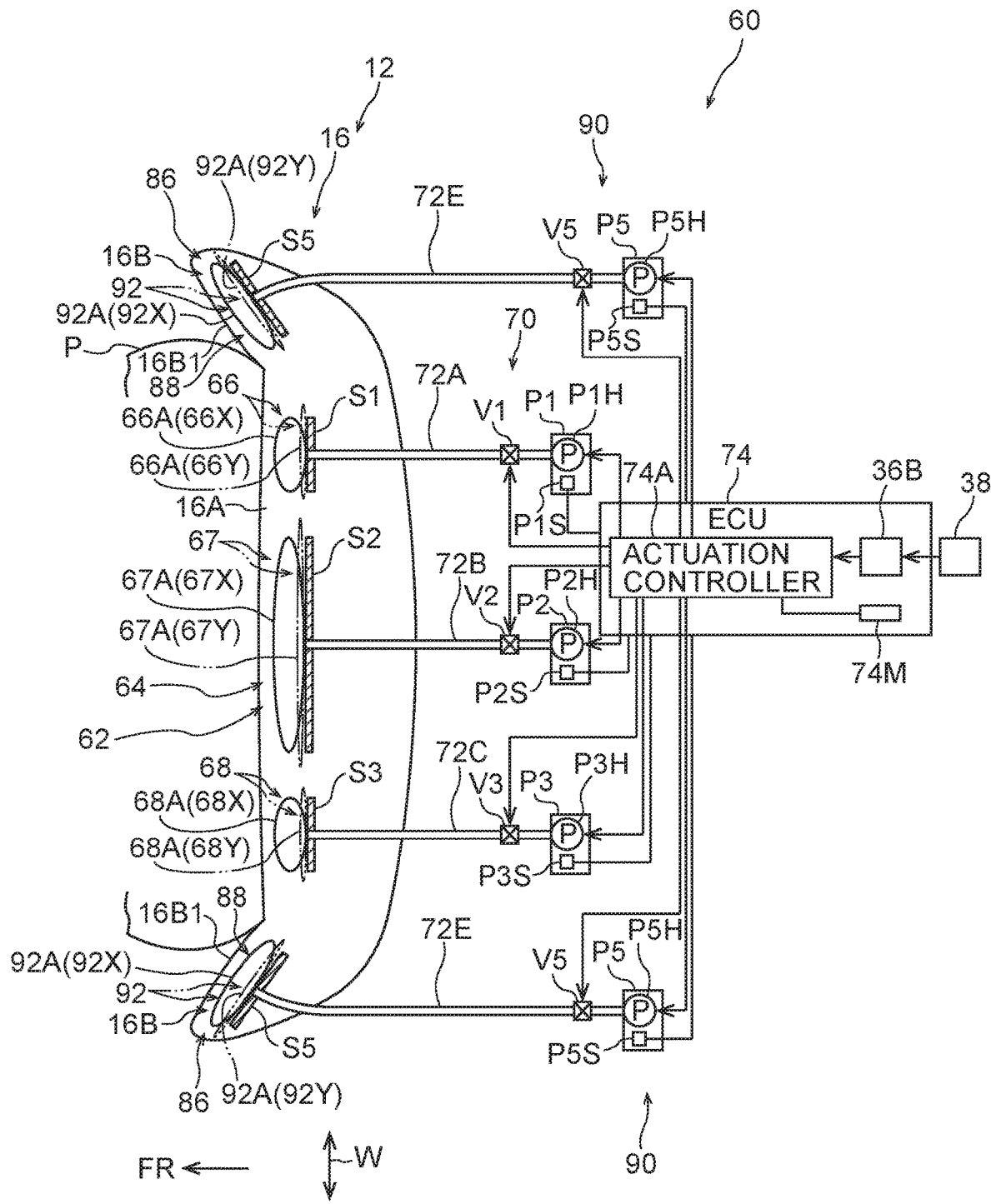
FIG. 5 is an enlarged cross-section schematically illustrating an enlarged state, sectioned along line 5-5 in FIG. 4.

Next, explanation follows regarding an occupant protection device 60 according to a second exemplary embodiment of the present invention, with reference to FIG. 4 and FIG. 5. Note that the second exemplary embodiment has substantially the same configuration as the first exemplary embodiment with the exception of the points described below. Accordingly, in the second exemplary embodiment, configuration sections that are substantially the same as in the first exemplary embodiment are allocated the same reference numerals, and explanation thereof is omitted.

FIG. 4 is a schematic side view illustrating the occupant protection device 60 according to the present exemplary embodiment, together with part of a vehicle seat 12. For ease of viewing, in FIG. 4, out of the internal configuration of a width direction intermediate portion of the backrest section 16A, configuration sections that are relevant portions of the present exemplary embodiment are illustrated by solid lines rather than intermittent lines. FIG. 5 is an enlarged cross-section schematically illustrating a state sectioned along line 5-5 in FIG. 4. FIG. 5 only illustrates configuration sections that are relevant portions of the present exemplary embodiment, and the seatback frame, the seatback pad, and the like are omitted from illustration.

Lumbar Support Device Configuration

As illustrated in FIG. 4, the occupant protection device 60 includes a lumbar support device 62 in place of the lumbar support device 40 (see FIG. 1) of the first exemplary embodiment. The lumbar support device 62 includes a lumbar support section 64 that supports the lumbar region of the occupant P seated on the seat cushion 14 of the vehicle seat 12, and also includes a gas supply mechanism section 70, serving as a displacement mechanism for displacing support faces 66A, 67A, 68A of the lumbar support section 64 (see FIG. 5). Note that as an example, the gas supply mechanism section 70 is installed inside the seatback 16. However, for convenience, in FIG. 4 the majority of the gas supply mechanism section 70 is illustrated at the outside of the seatback 16 (similar applies to FIG. 5).

As illustrated on the right side in FIG. 4, the vehicle is installed with an ECU 74. The ECU 74 includes an actuation controller 74A, a side collision prediction section 36B similar to that of the first exemplary embodiment, and a memory section 74M configured by RAM or the like. The actuation controller 74A has substantially the same configuration as the actuation controller 36A (see FIG. 1) of the first exemplary embodiment, except for in the following points.

The lumbar support section 64 is inbuilt to the backrest section 16A (a width direction intermediate portion of the seatback 16) over a range that supports the lumbar region of the occupant P (a lower portion side of the backrest section 16A). As illustrated in FIG. 5, the lumbar support section 64 is configured including a total of three air bladders 66, 67, 68 in a row along the width direction of the backrest section 16A. Support faces 66A, 67A, 68A of the lumbar support section 64 that support the lumbar region of the occupant P are configured by front faces (faces on the seatback front side) of the air bladders 66, 67, 68. Out of the three air bladders 66, 67, 68, the air bladder 67 in the middle is disposed at a width direction central portion of the backrest section 16A, and out of the three air bladders 66, 67, 68, the air bladders 66, 68 on either side are disposed at the side of side portions of the backrest section 16A. The air bladders 66, 67, 68 are attached to support plates S1, S2, S3 disposed at the seatback rear side of the respective air bladders 66, 67, 68. The support plates S1, S2, S3 are disposed such that faces thereof opposing the air bladders 66, 67, 68 are disposed running along the seatback width direction and the seatback up-down direction, and are attached to the seatback frame, not illustrated in the drawings.

The respective air bladders 66, 67, 68 adopt an inflated state (illustrated by solid lines in the drawings) when air (gas) flows inside, and adopt a contracted state (illustrated by double-dotted intermittent lines in the drawings) by releasing the air (gas) from inside. The inflation direction of the air bladders 66, 67, 68 is toward the seatback front side, on the opposite side to the support plates S1, S2, S3. The support faces 66A, 67A, 68A of the lumbar support section 64 are displaceable between advanced positions 66X, 67X, 68X that press the lumbar region of the occupant P, and retreated positions 66Y, 67Y, 68Y further to the seatback rear side than the advanced positions 66X, 67X, 68X, by the inflation and contraction of the air bladders 66, 67, 68.

The advanced positions 66X, 67X, 68X are the positions of front side movement limits of the support faces 66A, 67A, 68A of the lumbar support section 64 in the seatback front-rear direction, and may also be described as the positions furthest away from the support plates S1, S2, S3. The retreated positions 66Y, 67Y, 68Y are the positions of rear side movement limits of the support faces 66A, 67A, 68A of the lumbar support section 64 in the seatback front-rear direction, and may also be described as the positions closest to the support plates S1, S2, S3. Although not illustrated in the drawings, a front face of a lower portion of the backrest section 16A is displaced in the seatback front-rear direction accompanying the displacement of the support faces 66A, 67A, 68A of the lumbar support section 64 between the advanced positions 66X, 67X, 68X and the retreated positions 66Y, 67Y, 68Y.

The gas supply mechanism section 70 includes pumps P1, P2, P3, these being mechanism sections capable of supplying gas into the air bladders 66, 67, 68. The pumps P1, P2, P3 include pump bodies P1H, P2H, P3H, and sensor sections P1S, P2S, P3S. The pump bodies P1H, P2H, P3H are configured so as to be driven based on command signals output from the actuation controller 74A. The sensor sections P1S, P2S, P3S include, for example, Hall effect ICs. The sensor sections P1S, P2S, P3S are configured so as to output signals to the memory section 74M of the ECU 74 according to pressure increases or pressure decreases due to actuation of the pump bodies P1H, P2H, P3H. One end portions of tubes 72A, 72B, 72C are connected to the pump bodies P1H, P2H, P3H, and the air bladders 66, 67, 68 are connected to other end portions of the tubes 72A, 72B, 72C. Valves V1, V2, V3 are provided at flow path intermediate portions of the respective tubes 72A, 72B, 72C.

The air bladders 66, 67, 68 are switched between the inflated state and the contracted state by actuating the pump bodies P1H, P2H, P3H and the valves V1, V2, V3. The gas supply mechanism section 70 displaces the support faces 66A, 67A, 68A of the lumbar support section 64 between the advanced positions 66X, 67X, 68X and the retreated positions 66Y, 67Y, 68Y by actuating the pump bodies P1H, P2H, P3H and the valves V1, V2, V3 in this manner.

At a side face of the seat cushion 14 (see FIG. 4), the lumbar support device 62 also includes a manual switch (not illustrated in the drawings) employed by the occupant to adjust the positions of support faces 66A, 67A, 68A of the lumbar support section 64, similarly to in the first exemplary embodiment. The manual switch is configured to output signals to the ECU 74 according to the operation of the occupant.

The ECU 74 is electrically connected to the pumps P1, P2, P3 and the valves V1, V2, V3. In cases in which a vehicle side-on collision has been predicted by the side collision prediction section 36B in a state in which the support faces 66A, 67A, 68A of the lumbar support section 64 are not at the retreated positions 66Y, 67Y, 68Y, the actuation controller 74A of the ECU 74 controls the pump bodies P1H, P2H, P3H and the valves V1, V2, V3 of the gas supply mechanism section 70 so as to displace the support faces 66A, 67A, 68A of the lumbar support section 64 to the retreated positions 66Y, 67Y, 68Y. In cases in which a vehicle side-on collision has been predicted by the side collision prediction section 36B in a state in which the support faces 66A, 67A, 68A of the lumbar support section 64 are not at the retreated positions 66Y, 67Y, 68Y, the actuation controller 74A also actuates a motor (34A (see FIG. 1)) of a pre-tensioner (34 (see FIG. 1)) so as to take up the seatbelt 22 (see FIG. 4) onto a spool (26S (see FIG. 1)) so as to match the displacement of the support faces 66A, 67A, 68A of the lumbar support section 64 toward the seatback rear side.

The memory section 74M stores signals output from the sensor sections P1S, P2S, P3S as inflation/contraction amount information of the air bladders 66, 67, 68. The actuation controller 74A determines whether or not a state is present in which the support faces 66A, 67A, 68A of the lumbar support section 64 are not at the retreated positions 66Y, 67Y, 68Y based on the inflation/contraction amount information of the air bladders 66, 67, 68 stored in the memory section 74M. Moreover, the actuation controller 74A does not actuate the gas supply mechanism section 70 in cases in which a vehicle side-on collision has been predicted by the side collision prediction section 36B in a state in which the support faces 66A, 67A, 68A of the lumbar support section 64 are at the retreated positions 66Y, 67Y, 68Y.

Upper Support Device Configuration

As illustrated in FIG. 4, the occupant protection device 60 includes an upper support device 78 at the seatback upper side of the lumbar support device 62. The upper support device 78 includes an upper support section 80 that supports a region (thoracic spine region) further to the seatback upper side than the lumbar region of the occupant P seated on the seat cushion 14 of the vehicle seat 12. The upper support device 78 further includes a gas supply mechanism section 82 (this being an element that may also be understood as a "displacement mechanism section") for displacing a support face 84A of the upper support section 80. Note that as an example, the gas supply mechanism section 82 is installed inside the seatback 16. However, for convenience, in FIG. 4, the majority of the gas supply mechanism section 82 is illustrated at the outside of the seatback 16.

The upper support section 80 is inbuilt to the backrest section 16A over a range (at an upper portion side of the backrest section 16A) that supports the region (the thoracic spine region) further to the seatback upper side than the lumbar region of the occupant P (at a width direction intermediate portion of the seatback 16). The upper support section 80 is configured including an air bladder 84. A support face 84A of the upper support section 80 that supports the thoracic spine region of the occupant P is configured by a front face (seatback front side face) of the air bladder 84. The air bladder 84 of the upper support section 80 is smaller than the air bladder 67 of the lumbar support section 64, and is attached to a support plate S4 disposed at the seatback rear side of the air bladder 84. The support plate S4 is disposed such that a face opposing the air bladder 84 runs in the seatback width direction and the seatback up-down direction, and is attached to the seatback frame, not illustrated in the drawings.

The air bladder 84 of the upper support section 80 inflates and contracts accompanying air (gas) flowing in or flowing out, similarly to the air bladder 67 of the lumbar support section 64. In FIG. 4, an inflated state of the air bladder 84 is illustrated by a solid line, and a contracted state of the air bladder 84 is illustrated by a double-dotted intermittent line. The inflation direction of the air bladder 84 is toward the seatback front side, on the opposite side to the support plate S4 side. The support face 84A of the upper support section 80 is displaceable between an advanced position 84X pressing the thoracic spine region of the occupant P, and a retreated position 84Y further to the seatback rear side than the advanced position 84X, by inflation and contraction of the air bladder 84.

The advanced position 84X is the position of a front side movement limit of the support face 84A of the upper support section 80 in the seatback front-rear direction, and may also be described as the position furthest away from the support plate S4. The retreated position 84Y is the position of a rear side movement limit of the support face 84A of the upper support section 80 in the seatback front-rear direction, and may also be described as the position closest to the support plate S4. Although not illustrated in the drawings, a front face of an upper portion of the backrest section 16A is displaced in the seatback front-rear direction accompanying the displacement of the support face 84A of the upper support section 80 between the advanced position 84X and the retreated position 84Y.

The gas supply mechanism section 82 of the upper support device 78 has effectively the same configuration as the gas supply mechanism section 70 of the lumbar support device 62, and includes a pump P4 that is a mechanism section capable of supplying gas into the air bladder 84. The pump P4 includes a pump body P4H and a sensor section P4S. The pump body P4H is configured so as to be driven based on command signals output from the actuation controller 74A. The sensor section P4S is configured so as to output signals to the memory section 74M of the ECU 74 according to pressure increases or pressure decreases due to actuation of the pump body P4H. One end portion of a tube 72D is connected to the pump body P4H, and the air bladder 84 is connected to the other end portion of the tube 72D. A valve V4 is provided at a flow path intermediate portion of the tube 72D. The air bladder 84 is switched between the inflated state and the contracted state by actuating the pump body P4H and the valve V4. The gas supply mechanism section 82 displaces the support face 84A of the upper support section 80 between the advanced position 84X and the retreated position 84Y by actuating the pump body P4H and the valve V4 in this manner.

At a side face of the seat cushion 14, the upper support device 78 also includes a manual switch (not illustrated in the drawings) employed by the occupant to adjust the position of the support face 84A of the upper support section 80, similarly to the lumbar support device 62. The manual switch is configured to output signals to the ECU 74 according to the operation of the occupant.

The ECU 74 is electrically connected to the pump P4 and the valve V4. In cases in which a vehicle side-on collision has been predicted by the side collision prediction section 36B in a state in which the support face 84A of the upper support section 80 is not at the retreated position 84Y, the actuation controller 74A of the ECU 74 controls the pump body P4H and the valve V4 of the gas supply mechanism section 82 such that the support face 84A of the upper support section 80 is displaced to the retreated position 84Y. Specifically, in cases in which a vehicle side-on collision has been predicted by the side collision prediction section 36B in a state in which the support face 84A of the upper support section 80 is not at the retreated position 84Y, the actuation controller 74A controls the pump body P4H and the valve V4 of the gas supply mechanism section 82 so as to displace the support face 84A of the upper support section 80 toward the seatback rear side so as to match the displacement of the support faces 66A, 67A, 68A of the lumbar support section 64 (see FIG. 5) toward the seatback rear side.

The memory section 74M stores the signals output from the sensor section P4S as inflation/contraction amount information of the air bladder 84, and the actuation controller 74A determines whether or not a state is present in which the support face 84A of the upper support section 80 is not at the retreated position 84Y based on the inflation/contraction amount information of the air bladder 84 stored in the memory section 74M. Moreover, the actuation controller 74A does not actuate the gas supply mechanism section 82 in cases in which a vehicle side-on collision has been predicted by the side collision prediction section 36B in a state in which the support face 84A of the upper support section 80 is at the retreated position 84Y.

Side Support Device Configuration

As illustrated in FIG. 5, the occupant protection device 60 further includes side support devices 86 in the pair of left and right side support sections 16B of the seatback 16. In the present exemplary embodiment, each side support section 16B is provided with an angled front face 16B1 set so as to face the side of the occupant P and at an angle toward the seatback rear side on progression toward the seatback width direction inside. Each side support device 86 includes a side support section 88 that supports a side portion of the occupant P seated on the seat cushion 14 (see FIG. 4) of the vehicle seat 12, and also includes a gas supply mechanism 90 (this being an element that may also be understood as a "displacement mechanism section") for displacing a support face 92A of the side support section 88. Note that as an example, the gas supply mechanism 90 is installed inside the seatback 16. However, for convenience, in FIG. 5, the majority of the gas supply mechanism 90 is illustrated at the outside of the seatback 16.

The side support sections 88 are inbuilt to the pair of left and right side support sections 16B respectively. Each side support section 88 includes an air bladder 92, serving as a bladder body, and the air bladder 92 is attached to a support plate S5 disposed to the seatback rear side thereof. The support face 92A of the side support section 88 that supports the side portion of the occupant P is a portion of an outer face of the air bladder 92, and is configured by a face facing toward the side of the angled front face 16B1 of the side support section 16B. In FIG. 5, the pair of left and right air bladders 92 are allocated the same reference numerals rather than being allocated separate reference numerals for the left and right (similar applies to the support plates S5). Faces of the support plates S5 opposing the respective air bladders 92 are disposed at an angle toward the seatback rear side on progression toward the seatback width direction inside, and so as to run along the seatback up-down direction. The support plates S5 are attached to the seatback frame, not illustrated in the drawings.

The air bladder 92 disposed inside each side support section 16B inflates and contracts accompanying air (gas) flowing in or flowing out, similarly to the air bladders 66, 67, 68 disposed inside the backrest section 16A. In FIG. 5, an inflated state of the air bladder 92 is illustrated by solid lines, and a contracted state of the air bladder 92 is illustrated by double-dotted intermittent lines. The inflation direction of the air bladder 92 is toward the side of the angled front face 16B1 of the side support section 16B (the opposite side to the support plate S5 side).

The support face 92A of each side support section 88 is displaceable between an advanced position 92X that is furthest away from the support plate S5, and a retreated position 92Y that is closest to the support plate S5, by inflation and contraction of the air bladder 92. The air bladder 92 is configured so as to inflate toward the side of the angled front face 16B1 of the side support section 16B when supplied with gas, such that the angled front face 16B1 of the side support section 16B is made to protrude out further toward the seatback front side. Although not illustrated in the drawings, the angled front face 16B1 of the side support section 16B is also displaced accompanying the displacement of the support face 92A of the side support section 88 between the advanced position 92X and the retreated position 92Y.

The gas supply mechanism 90 of each side support device 86 has effectively the same configuration as the gas supply mechanism section 70 of the lumbar support device 62, and includes a pump P5 that is a mechanism section capable of supplying gas into the air bladder 92. Although the respective configuration elements of the gas supply mechanism 90 are provided in left and right pairs corresponding to the pair of left and right air bladders 92, in FIG. 5 they are allocated the same reference numerals rather than being allocated separate reference numerals for the left and right. The pump P5 includes a pump body P5H and a sensor section P5S. The pump body P5H is configured so as to be driven based on command signals output from the actuation controller 74A. The sensor section P5S is configured so as to output signals to the memory section 74M of the ECU 74 according to pressure increases or pressure decreases due to actuation of the pump body P5H. One end portion of a tube 72E is connected to the pump body P5H, and the air bladder 92 is connected to the other end portion of the tube 72E. A valve V5 is provided at a flow path intermediate portions of the tube 72E. The air bladder 92 is switched between the inflated state and the contracted state by actuating the pump body P5H and the valve V5, and the gas supply mechanism 90 displaces the support face 92A of the side support section 88 between the advanced position 92X and the retreated position 92Y by actuating the pump body P5H and the valve V5.

At a side face of the seat cushion 14 (see FIG. 4), the side support devices 86 also include a manual switch (not illustrated in the drawings) employed by the occupant to adjust the position of the support face 92A of the side support section 88, similarly to the lumbar support device 62. The manual switch is configured to output signals to the ECU 74 according to the operation of the occupant.

The ECU 74 is electrically connected to the pump P5 and the valve V5. In cases in which a vehicle side-on collision has been predicted by the side collision prediction section 36B in a state in which the support face 92A of the side support section 88 is not at the advanced position 92X, the actuation controller 74A of the ECU 74 controls the pump body P5H and the valve V5 of the gas supply mechanism 90 such that the support face 92A of the side support section 88 is displaced to the advanced position 92X. In other words, in cases in which a vehicle side-on collision has been predicted by the side collision prediction section 36B in a state in which the air bladder 92 is not in a maximum inflation state, the actuation controller 74A actuates the pump body P5H and the valve V5 of the gas supply mechanism 90 so as to supply gas inside the air bladder 92.

The memory section 74M stores the signals output from the sensor section P5S as inflation/contraction amount information of the air bladder 92, and the actuation controller 74A determines whether or not a state is present in which the air bladder 92 is not in the maximum inflation state (whether or not a state is present in which the support face 92A of the side support section 88 is not at the advanced position 92X) based on the inflation/contraction amount information of the air bladder 92 stored in the memory section 74M. Moreover, the actuation controller 74A does not actuate the gas supply mechanism 90 in cases in which a vehicle side-on collision has been predicted by the side collision prediction section 36B in a state in which the air bladder 92 is in the maximum inflation state.

Operation and Advantageous Effects

Next, explanation follows regarding operation and advantageous effects of the present exemplary embodiment.

In the present exemplary embodiment, in cases in which a vehicle side-on collision has been predicted by the side collision prediction section 36B in a state in which the support faces 66A, 67A, 68A of the lumbar support section 64 are not at the retreated positions 66Y, 67Y, 68Y, the valves V1, V2, V3 are opened, and the pump bodies P1H, P2H, P3H are actuated such that gas flows out from inside the air bladders 66, 67, 68. The support faces 66A, 67A, 68A of the lumbar support section 64 are accordingly displaced to the retreated positions 66Y, 67Y, 68Y, thereby obtaining similar operation and advantageous effects to in the first exemplary embodiment.

Note that in the present exemplary embodiment, in cases in which a vehicle side-on collision has been predicted by the side collision prediction section 36B in a state in which the support face 84A of the upper support section 80 illustrated in FIG. 4 is not at the retreated position 84Y, the valve V4 is opened and the pump body P4H is actuated such that gas flows out from inside the air bladder 84. The support face 84A of the upper support section 80 is accordingly displaced to the retreated position 84Y. More specifically, the upper support section 80 is displaced toward the seatback rear side accompanying the displacement of the support faces 66A, 67A, 68A (see FIG. 5) of the lumbar support section 64 toward the seatback rear side. The upper body of the occupant P that was resting against the backrest section 16A thereby undergoes displacement toward the seatback rear side under its own weight at the region further to the upper side than the lumbar region, thereby enabling an overlap amount between the side support sections 16B and the upper body region (region further to the upper side than the lumbar region) of the occupant P as viewed from the side of the vehicle to be increased. This thereby enables the occupant P to be even more stably supported by the side support sections 16B during a side-on collision, even when the support face 84A of the upper support section 80 is not at the retreated position 84Y immediately prior to prediction of a vehicle side-on collision.

In the present exemplary embodiment, similarly to in the first exemplary embodiment, in cases in which a vehicle side-on collision has been predicted by the side collision prediction section 36B in a state in which the support faces 66A, 67A, 68A of the lumbar support section 64 illustrated in FIG. 5 are not at the retreated positions 66Y, 67Y, 68Y, the pre-tensioner (34 (see FIG. 1)) is actuated, and the seatbelt 22 (see FIG. 4) is taken up onto the spool (26S (see FIG. 1)) so as to match the displacement of the support faces 66A, 67A, 68A of the lumbar support section 64 toward the seatback rear side. This also enables similar operation and advantageous effects to be obtained those of the first exemplary embodiment.

In the present exemplary embodiment, in cases in which a vehicle side-on collision has been predicted by the side collision prediction section 36B in a state in which the air bladders 92 of the side support sections 16B are not in the maximum inflation state, the valves V5 are opened and the pump bodies P5H are actuated such that gas flows inside the air bladders 92. The angled front faces 16B1 of the side support sections 16B accordingly protrude out further toward the seatback front side due to supplying gas inside the air bladders 92 of the side support sections 16B, such that the air bladders 92 adopt the maximum inflation state. This thereby enables the occupant P attempting to move in the vehicle width direction during a side-on collision to be supported even at the locations where the side support sections 16B protrude out further toward the seatback front side. Due to the air bladders 92 adopting the maximum inflation state, the energy absorption amount of the side support sections 16B can be increased in cases in which a side door (not illustrated in the drawings) deforms toward the vehicle width direction inside and abuts the side support sections 16B in the event of a side-on collision.

As described above, in the present exemplary embodiment, the seated occupant can be well-supported by the side support sections 16B in the event of a side-on collision, thereby enabling good occupant protection performance to be obtained even when, as a result of operation by the occupant, the support faces 66A, 67A, 68A of the lumbar support section 64 are not set at the retreated positions 66Y, 67Y, 68Y.

Supplementary Explanation of the Exemplary Embodiments

In the exemplary embodiments described above, the vehicle seat 12 is configured as a front driving seat disposed with the seat width direction running along the vehicle width direction, and disposed facing the vehicle front side. However, the vehicle seat may, for example, be a vehicle seat configured by a front passenger seat disposed with the seat width direction running along the vehicle width direction, and may be disposed facing either the vehicle front side or the vehicle rear side.

As a modified example of the exemplary embodiments described above, the actuation controller may actuate the pre-tensioner so as to take up the seatbelt onto the spool at about the time the support face of the lumbar support section is displaced toward the seatback rear side in cases in which a vehicle side-on collision has been predicted by the side collision prediction section in a state in which the support face of the lumbar support section is not at the retreated position. As another modified example, configuration may be made in which the pre-tensioner is not set so as to actuate when a vehicle side-on collision has been predicted by the side collision prediction section.

As a modified example of the second exemplary embodiment, configuration may be made in which the upper support device 78 illustrated in FIG. 4 is not provided, and configuration may be made in which the side support devices 86 illustrated in FIG. 5 is not provided.

In the second exemplary embodiment, the face of each support plate S5 opposing the respective air bladder 92 is disposed at an angle toward the seatback rear side on progression toward the seatback width direction inside, and runs along the seatback up-down direction. However, as a modified example of the second exemplary embodiment, a support plate S5 to which an air bladder 92, serving as a bladder body, is attached, may be attached to the seatback frame disposed so as to run along the seatback width direction and the seatback up-down direction. In other words, in the second exemplary embodiment, the air bladder 92 is set so as to inflate obliquely toward the seatback width direction inside with respect to the seatback front side when supplied with gas. However, the air bladder 92, serving as a bladder body, may be set so as to inflate in a direction running in the seatback front-rear direction toward the seatback front side when it is supplied with gas.

The concept of "causing the side support section to protrude out further toward the seatback front side" in the third aspect encompasses causing the side support section to protrude out further toward the seatback front side such that a seatback front side frontmost position of the side support section 16B is positioned further to the seatback front side (in a configuration such as that illustrated in FIG. 5, the position of a seatback width direction outside end portion out of the angled front face 16B1 of the side support section 16B), and also encompasses, for example, cases in which, in a configuration such as that illustrated in FIG. 5, a portion of the angled front face 16B1 of the side support section 16B is caused to protrude out further toward the seatback front side, and there is no change to the seatback front side frontmost position of the side support section 16B (in other words, the position of the seatback width direction outside end portion of the angled front face 16B1 of the side support section 16B).

Combinations of the exemplary embodiments and the plural modified examples described above may be implemented as appropriate.

Explanation has been given regarding examples of the present invention; however, the present invention is not limited to the above, and obviously various other modifications may be implemented within a range not departing from the spirit of the present invention.

What is claimed is:

1. An occupant protection device comprising:
   a side support section that configures portions on both width direction sides of a seatback of a vehicle seat disposed with a seat width direction in a vehicle width direction, and that protrudes out further toward a seatback front side than a width direction intermediate portion of the seatback;
   a lumbar support section that is provided to the width direction intermediate portion of the seatback, that is configured to support a lumbar region of an occupant seated on a seat cushion of the vehicle seat, and that has a lumbar support face displaceable between a first advanced position for pressing the lumbar region and a first retreated position further to a seatback rear side than the first advanced position;
   a first displacement mechanism that displaces the lumbar support face of the lumbar support section between the first advanced position and the first retreated position;
   a side collision prediction section that predicts a side-on collision to a vehicle;
   an actuation controller that, in a case in which a vehicle side-on collision has been predicted by the side collision prediction section in a state in which the lumbar support face of the lumbar support section is not at the first retreated position, controls the first displacement mechanism so as to displace the lumbar support face of the lumbar support section to the first retreated position; and
   a three-point seatbelt device that includes a spool that takes up a seatbelt, that is configured to extend across the seatback in the vehicle width direction from an upper end of the seatback in the vehicle height direction to an inner side of the seat cushion in the vehicle width direction to restrain the upper body of the occupant seated on the seat cushion with a shoulder belt portion of the seatbelt, and that is configured to extend from the inner side of the seat cushion to an outer side of the seat cushion in the vehicle width direction to restrain the lumbar region of the occupant with a lap belt portion of the seatbelt; and a pre-tensioner that actuates to rotate the spool in a direction to take up the seatbelt so as to apply tension to the shoulder belt portion, wherein in the case in which the vehicle side-on collision has been predicted by the side collision prediction section in the state in which the lumbar support face of the lumbar support section is not at the first retreated position, the actuation controller is configured to actuate the pre-tensioner so as to take up the seatbelt onto the spool such that a displacement of the seatbelt matches a displacement of the lumbar support face of the lumbar support section toward the seatback rear side, wherein the actuation controller outputs a drive command signal to actuate the first displacement mechanism earlier than outputting a drive command signal to actuate the pre-tensioner, such that the pre-tensioner takes up the seatbelt onto the spool to match the displacement of the seatbelt with the displacement of the lumbar support face of the lumbar support section toward the seatback rear side.

2. The occupant protection device of claim 1, further comprising:

a bladder body that is disposed inside the side support section, and that is inflated by being supplied with gas to cause the side support section to protrude out further toward the seatback front side; and a gas supply mechanism that supplies the gas to an inside of the bladder body, wherein in the case in which the vehicle side-on collision has been predicted by the side collision prediction section in a state in which the bladder body is not in a maximum inflation state, the actuation controller actuates the gas supply mechanism so as to supply the gas to the inside of the bladder body.

3. The occupant protection device of claim 1, wherein the lumbar support section is positioned closer to a lower end of the seatback that is adjacent to the seat cushion than to an upper end of the seatback that is distal to the seat cushion.

4. The occupant protection device of claim 1, further comprising:

an upper support section that is provided to the width direction intermediate portion of the seatback, that is configured to support a thoracic spine region further to a seatback upper side than the lumbar region of the occupant seated on the seat cushion of the vehicle seat, and that has a thoracic spine support face displaceable between a second advanced position for pressing the thoracic spine region and a second retreated position further to a seatback rear side than the second advanced position, the thoracic spine support face being positioned in a vertical direction between the seatback upper side and the lumbar support section;

a second displacement mechanism that displaces the thoracic spine support face of the upper support section between the second advanced position and the second retreated position, wherein a side collision prediction section that predicts a side-on collision to a vehicle; and the actuation controller that, in a case in which the vehicle side-on collision has been predicted by the side collision prediction section in a state in which the thoracic spine support face of the upper support section is not at the second retreated position, controls the second displacement mechanism so as to displace the thoracic spine support face of the thoracic spine support section to the second retreated position.

5. The occupant protection device of claim 4, further comprising:

a bladder body that is disposed inside the side support section, and that is inflated by being supplied with gas to cause the side support section to protrude out further toward the seatback front side; and a gas supply mechanism that supplies the gas to an inside of the bladder body, wherein in the case in which the vehicle side-on collision has been predicted by the side collision prediction section in a state in which the bladder body is not in a maximum inflation state, the actuation controller actuates the gas supply mechanism so as to supply the gas to the inside of the bladder body.

6. The occupant protection device of claim 4, wherein the lumbar support section is positioned closer to lower end of the seatback that is adjacent to the seat cushion than to the upper end of the seatback that is distal to the seat cushion.

* * * * *